United States Patent [19]

Ditscheid et al.

[11] Patent Number: 4,659,174
[45] Date of Patent: Apr. 21, 1987

[54] OPTICAL CABLE ELEMENT AND CABLE, RESPECTIVELY, AND METHOD OF MANUFACTURING SAME

[75] Inventors: Hans L. Ditscheid, Bergisch Gladbach; Walter Burger, Kürten-Herweg, both of Fed. Rep. of Germany

[73] Assignee: U.S. Philips Corporation, New York, N.Y.

[21] Appl. No.: 611,265

[22] Filed: May 17, 1984

[30] Foreign Application Priority Data

May 19, 1983 [DE] Fed. Rep. of Germany ....... 3318233

[51] Int. Cl.⁴ .......................... G02B 6/44; H01B 11/02
[52] U.S. Cl. ............................... 350/96.23; 350/96.24; 350/320; 174/70 R; 174/113 AS
[58] Field of Search ............... 350/96.23, 96.24, 96.29, 350/96.30, 96.33, 320; 174/115, 116, 117 AS, 70 R, 70 S, 113 AS

[56] References Cited

U.S. PATENT DOCUMENTS

| 3,746,424 | 3/1973 | Hermstein | 350/96.23 |
| 4,082,423 | 4/1978 | Glista et al. | 350/96.23 |
| 4,550,976 | 11/1985 | Cooper et al. | 350/96.23 |

FOREIGN PATENT DOCUMENTS

| 2556861 | 7/1976 | Fed. Rep. of Germany | 350/96.23 |
| 53-130048 | 11/1978 | Japan | 350/96.23 |
| 55-127503 | 2/1980 | Japan | 350/96.23 |
| 56-135805 | 10/1981 | Japan | 350/96.23 |
| 2078996 | 1/1982 | United Kingdom | 350/96.23 |
| 2096343 | 10/1982 | United Kingdom | 350/96.23 |

OTHER PUBLICATIONS

Grasso et al., "High Quality Optical Fibre Cable for Telecommunications", Conf. of the 27th Int. Wire and Cable Sympos., 11/78, pp. 394–403.

*Primary Examiner*—William L. Sikes
*Assistant Examiner*—Brian M. Healy
*Attorney, Agent, or Firm*—Marc D. Schechter

[57] ABSTRACT

An optical cable element includes an optical waveguide loosely embedded in a bundle of strength fibers. A protective mantle surrounds the waveguide-containing bundle of strength fibers.

8 Claims, 5 Drawing Figures

OPTICAL CABLE ELEMENT AND CABLE, RESPECTIVELY, AND METHOD OF MANUFACTURING SAME

BACKGROUND OF THE INVENTION

The invention relates to an optical cable element having a mantle or envelope in which at least one optical waveguide (OWG) is accommodated. The optical waveguide is surrounded by tensile strength fibers. The strength fibers extend substantially parallel to the waveguide.

The invention further relates to an optical cable having such a cable element, a method of manufacturing the cable element and the cable, respectively.

An optical cable element of the type described above is already known from U.S. Pat. No. 4,082,423. According to FIG. 3 of U.S. Pat. No. 4,082,423, the optical waveguides are surrounded, for example, by a common first mantle of synthetic resin on which the strength fibers are arranged. The strength fibers, in turn, are surrounded by further common mantles or coatings. The tensile strength of the cable element derives from the strength fibers provided on the first mantle of synthetic resin. Buckling of the optical waveguide as a result of compression is initially prevented by the first mantle of synthetic resin itself. This, however, reduces the flexibility of the cable element due to its comparatively large thickness.

Moreover, it is known from U.S. Pat. No. 4,082,423 that in general optical cable elements may have strength fibers in their interior. However, a cable consisting of only optical waveguides and strength fibers is not described in this patent.

SUMMARY OF THE INVENTION

It is an object of the invention to provide an optical cable element which can withstand both tensile forces and compressive forces without significantly influencing the optical transmission properties of the optical waveguides, which nevertheless is simple in construction, and which is very flexible.

According to the invention this object is achieved by filling the space inside the mantle with only the optical waveguides and the strength fibers surrounding the optical waveguides. Only 50 to 90% of this space is filled. The optical waveguides are embedded in the strength fibers, and the strength fibers are embedded inside the mantle so loosely that the optical waveguides are comparatively freely movable in the fibers, and the fibers are comparatively freely movable in the mantle.

The optical cable element therefore has a simple construction. This is advantageous for producing the cable element, since it consists only of the optical waveguide, the strength fiber and the common mantle or envelope. Since no thick intermediate layers of synthetic resin are provided, the cable element has a high flexibility. Tensile forces applied to the cable element are absorbed elastically by the strength fibers, the overall cross-sectional areas of which are substantially larger then the overall cross-sectional areas of all the optical waveguides in the cable element. The optical waveguides may be provided with overlengths by applying tension to the strength fibers while manufacturing the cable elements.

Compressive forces or bending forces applied to the cable element cannot substantially influence the optical transmission properties of the optical waveguide since the optical waveguides can move freely inside the strength fibers.

When several parallel optical waveguides are embedded within the strength fibers, the transmission capacity of the cable element is increased correspondingly. The individual optical waveguide may, in addition, comprise a thin secondary protective coating rigidly connected thereto. The secondary coating may be, for example, synthetic resin. The secondary coating protects the waveguide from mechanical stresses, in particular by adjacent fibers or other optical waveguides, without reducing the flexibility of the cable element.

In an advantageous embodiment of the invention, the optical waveguides together with the strength fibers occupy up to 60% to 70% of the space enclosed by the common mantle.

As a result of this, and since the diameters of the strength fibers are proportioned so that the free effective length of a corresponding fiber bundle is less than 50% of that of all the optical waveguides used, when the cable element is strongly compressed the optical waveguides are deflected laterally by the deflecting fibers. The fibers and waveguides then assume helical configurations which cause only small unsetting and bending forces, and hence only comparatively low contact pressures on the inner wall of the mantle. Moreover, an optical waveguide in a helical configuration can withstand a comparatively strong compression without damage.

Smaller free effective length in the above sense means that axial forces deflect the fibers of the fiber bundle sooner than the optical waveguides. Hence the fiber bundle will jump-up sooner.

The strength fibers advantageously consists of a tension-proof material, for example textile glass, aramide, carbon or metal. The modulus of elasticity of the strength fibers is comparable to that of the optical waveguides.

The mantle may consist of a thermoplastic material or of a cross-linked synthetic material which may be filled and mixed, respectively, with inorganic materials. These materials are comparatively inexpensive as compared with the fluoropolymers otherwise used for such purposes.

In order to improve the mechanical protection of the cable element it is advantageous to manufacture the mantle from various layers provided concentrically with respect to each other. For example, an inner comparatively hard coating layer of a synthetic material may be surrounded by a material having a modulus of elasticity which is less than 50% of that of the inner coating. For this purpose, a solid low-shrinkage synthetic material, for example polypropylene, polyamide, or polyvinylidene fluoride, is used for the inner coating layer. In order to improve the handleability and to reduce the spring rate of the cable, the inner coating layer is advantageously surrounded by a thicker-walled second coating layer of a softer material, for example soft PVC.

Therefore, it is advantageous to provide the cable element additionally with an outer envelope which consists, for example, of a metallic conductive material. The metallic envelope may be, for example, one or more closed metal cylinders. The outer envelope may provide, inter alia, both mechanical protection and screening.

According to an advantageous modified embodiment of the invention, the outer envelope of the cable element consists of metallic conductors in the form of braided strands or wires which are bear or insulated with respect to each other.

The optical cable element may also include electrical conductors. In such a case, it is not efficacious to include the conductors in the mantle of the individual cable element. It is more advantageous to provide the electrically conductive element concentrically around the mantle of the cable element. In this manner the optical cable element becomes more resistant to compression.

The outer envelope may also consist of a braid of nonmetallic wires or fibers.

In a cable, the outer envelope advantageously consists of two concentric layers. The inner layer consists of a nonmetallic material, the modulus of elasticity of which is very much larger than that of the mantle and of the outer envelope layer. For example, the material of the inner layer may consist of a glass fiber-synthetic resin composite (GFS), a carbon-synthetic resin composite (CFS), or an aramide (Kevlar) fiber resin composite, in which the inner layer is a closed tube or several cylindrical rods.

In special applications, requirements as to higher cross-sectional pressure or shear resistance are imposed on cables. In order to meet these requirements, a cable according to the invention comprises three concentric coatings (mantle, inner envelope layer, and outer envelope layer) which can be manufactured in only one operation by using the optical cable element. The high cross-sectional pressure resistance and shear resistance is achieved by using a bond of strength fibers and a binder, for example a polyester resin, in which the strength fibers are provided in the form of a matrix (inner envelope layer).

For manufacturing the cable in only one operation, the optical cable element (consisting of optical waveguides, strength fibers and mantle) leaves a first extruder and is immediately surrounded concentrically by parallel strength fibers. The strength fibers are impregnated with a reactive resin and are similar to those inside the common mantle of the cable element.

The thus obtained inner envelope layer is then provided concentrically with an outer envelope layer. The outer envelope layer provides a part of the required heat of reaction for the inner envelope layer. The complete reaction (vulcanization) of the inner envelope layer occurs advantageously in a subsequent pressure tube analogous to the known continuous vulcanization method. Providing the required (residual) heat of reaction in a further process step is possible.

Relative movement between the several layers can be prevented by providing a braid of nonmetallic fibers or wires between the layers of the envelope or between the envelope and the mantle.

DESCRIPTION OF THE PREFERRED EMBODIMENTS

Figure 1:
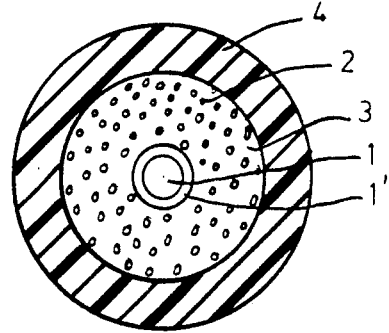
FIG. 1 is a cross-sectional view of an optical cable element having only one optical waveguide.

The optical cable element consists of an optical waveguide (OWG) 1 extending through the center of the cable element Waveguide 1 is surrounded by a "primary coating" 1', for example, a synthetic resin coating. Primary coating 1' is provided on waveguide 1 in the manufacture of the optical waveguide. "Optical waveguide" is to be understood to mean herein a fiber element for the transmission of optical (visible or invisible) radiation.

The OWG 1 is surrounded by tension-proof (strength) fibers 2 between which free spaces 3 exist. The fibers 2 are surrounded by a common mantle 4, which is the outer mantle of the optical cable element.

The strength fibers 2 consist, for example, of textile glass, aramide, carbon, metal or another suitable material having mechanical properties similar to those of the OWG. Strength fibers 2 receive tensile forces acting on the optical cable element so that the tensile forces are not transmitted to the optical waveguide 1. When the OWG 1 and the fibers 2 have the same mechanical properties, the total cross-sectional area of all the fibers 2 should therefore be substantially larger than that of the optical waveguide 1.

Since the fibers 2 are parallel to each other and to the OWG 1, and the tensile fibers 2 are provided at a slightly larger prestress during the manufacture of the cable element, the OWG 1 in the finished cable element has an overlength with respect to the fibers 2. This ensures that when the cable element is under tensile stress, the OWG 1 experiences substantially no tensile stress.

The OWG 1 is surrounded only by strength fibers 2. Fibers 2 fill 50 to 90% of the space formed inside the cylindrical mantle 4. When upsetting or bending forces, for example as a result of a contraction or bending of the mantle 4, act on the strength fibers 2 and the optical waveguide 1, the optical waveguide 1 penetrates through the bundle of tensile fibers 2 in which it is embedded so that it bends helically. The strength fibers 2 are for that purpose proportioned according to number and individual fiber cross-section so that they easily deflect under very small upsetting and bending forces.

Depending on the filling factor of strength fibers 2 and optical waveguide 1 in the common mantle 4, the strength fibers 2 exert lateral forces on the OWG 1 when fibers 2 are bent. These forces produce the helical deflection of the OWG 1. As a result, a clamping effect which leads to microbending does not occur.

Figure 2:
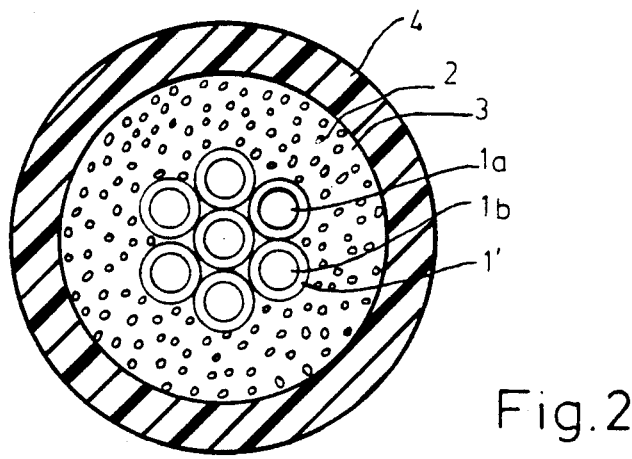
FIG. 2 is a cross-sectional view of an optical cable element having several optical waveguides.
Figure 3:
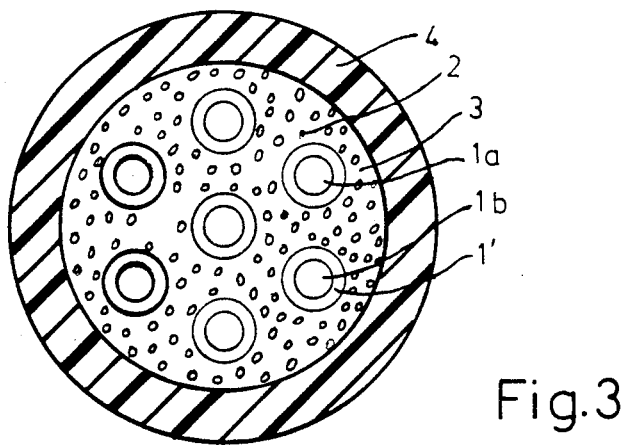
FIG. 3 is a cross-sectional view of another optical cable element having several optical waveguides.

FIGS. 2 and 3 are cross-sectional views of optical cable elements which have the same construction as in FIG. 1, but which comprise several parallel optical waveguides 1a and 1b. The waveguides are untwisted and extend parallel to the fibers 2. The waveguides are also provided with a "primary coating" 1'.

In FIG. 2, the optical waveguides are in the center of the cable element and are situated close together. In FIG. 3, they are distributed over the cross-sectional area within the mantle 4. In this case the waveguides are embedded in the fibers 2 so that they "swim" substantially in fiber bond. Fibers 2 and the waveguides also fill only part of the inner cross-section of the mantle 4.

For further protection of the waveguides, they may be provided with a so-called "secondary coating". The secondary coating may be a thin layer of synthetic resin.

Figure 4:
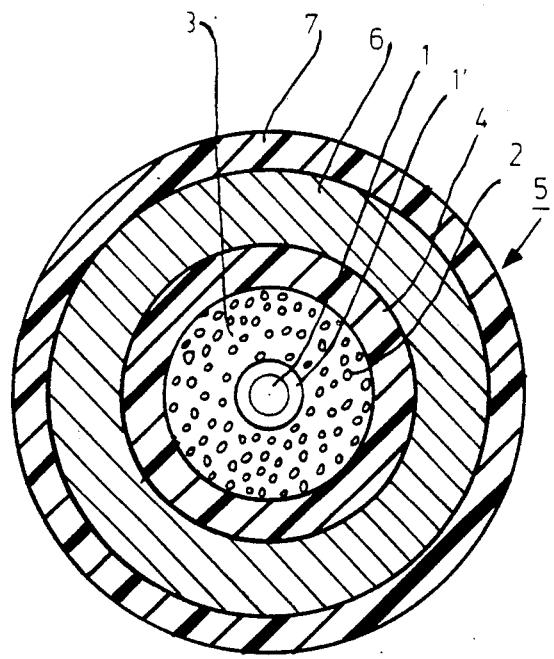
FIG. 4 is a cross-sectional view of an optical cable having an optical cable element shown in FIG. 1.

FIG. 4 shows an optical cable 5, the basic element of which is the optical cable element of FIG. 1. The cable element is surrounded by a further outer envelope which consists of an inner layer 6 and an outer layer 7. The inner layer 6 consists of a fiber-resin composite having a high crush resistance and shear resistance. The outer layer 7 may consist, for example, of another suitable softer synthetic resin.

The cable 5 may also have cable elements as shown in FIGS. 2 and 3. Moreover, it is also possible to produce optical cables in which several cable elements according to FIGS. 1 to 3 are surrounded by a common outer mantle.

Figure 5:
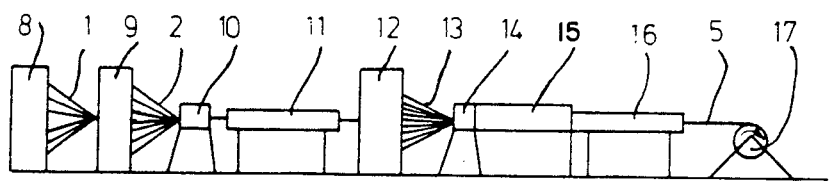
FIG. 5 schematically shows a device for manufacturing an optical cable element and optical cable according to the invention.

The method of manufacturing the optical cable element and the optical cable, respectively, in only one process step will now be described in greater detail with reference to FIG. 5.

In a supply unit 8 are optical waveguide storage containers. Waveguides are systematically sorted out by supply unit 8, and they enter the supply unit 9 parallel to each other. In supply unit 9, the strength fibers are stored. They form the omnilateral sheath for the waveguides. The strength fibers are stretched parallel to the optical waveguides, and remain untwisted, in the nozzle of a first extruder 10. In extruder 10, they are provided with the mantle 4. Mantle 4 is provided loosely so that the space within the mantle 4 is filled only partly by the fibers 2 and by the waveguides 1.

After leaving the cooling unit 11, the cable element enters the supply unit 12. In unit 12, further strength fibers 13 (or wires) are impregnated with a suitable binder to form the mantle 4 as an inner envelope layer 6. This is then surrounded by the outer envelope layer 7 by the nozzle of a further extruder 14. The heat of the material of the outer layer 7 together with the heat produced in the reaction apparatus 15 cures the binder. If necessary, fibers 13 and the binder may be compressed in apparatus 15.

The optical cable 5 thus produced then passes through a second cooling unit 16 in which it is cooled so that it can be reeled on a drum 17.

What is claimed is:

1. An optical cable element comprising:
   one or more optical waveguides, said waveguides not being coupled to each other;
   a plurality of strength fibers loosely surrounding the waveguides, said strength fibers extending substantially parallel to each other and to the waveguides, said strength fibers not being coupled to each other or to the waveguides; and
   a mantle surrounding the waveguides and fibers; characterized in that:
   the waveguides and fibers occupy 50% to 90% of the volume of the cable element within the mantle, the remaining volume being occupied by air;
   each optical waveguide is provided with a thin secondary coating; and
   the strength fibers have diameters which are proportioned such that the free effective length of the strength fibers is less than 50% that of the optical waveguides.

2. An optical cable element comprising:
   one or more optical waveguides, said waveguides not being coupled to each other;
   a plurality of strength fibers loosely surrounding the waveguides, said strength fibers extending substantially parallel to each other and to the waveguides, said strength fibers not being coupled to each other or to the waveguides; and
   a mantle surrounding the waveguides and fibers; characterized in that:
   the waveguides and fibers occupy 50% to 90% of the volume of the cable element within the mantle, the remaining volume being occupied by air;
   each optical waveguide is provided with a thin secondary coating;
   the mantle comprises an inner layer of synthetic material having a modulus of electicity; and
   the mantle comprises an outer layer of material surrounding the inner layer, said outer layer having a modulus of elasticity which is less than 50% of the modulus of elasticity of the inner layer.

3. An optical cable element as claimed in claim 2, characterized in that the strength fibers are made of textile glass, aramide, carbon, or metal.

4. An optical cable element as claimed in claim 2, characterized in that the cable element further comprises an outer cover of a metallic conductive material surrounding the mantle.

5. An optical cable element as claimed in claim 2, characterized in that the cable element further comprises an outer cover of braided nonmetallic wires or fibers surrounding the mantle.

6. An optical cable element as claimed in claim 5, characterized in that the outer cover comprises an inner envelope layer having a modulus of elasticity, and an outer envelope layer having a modulus of elasticity, the modulus of elasticity of the inner envelope layer being much larger than that of the mantle and of the outer envelope layer.

7. An optical cable element as claimed in claim 6, characterized in that the inner envelope layer is made of a fiber-synthetic resin composite.

8. An optical cable element as claimed in claim 6, further comprising:
   a first layer of braided metallic wires or fibers arranged between the mantle and the inner envelope layer; and
   a second layer of braided nonmetallic wires or fibers arranged between the inner and outer envelope layers.

* * * * *

UNITED STATES PATENT AND TRADEMARK OFFICE
CERTIFICATE OF CORRECTION

PATENT NO. : 4,659,174

DATED : Apr. 21, 1987

INVENTOR(S) : HANS L. DITSCHEID ET AL

It is certified that error appears in the above-identified patent and that said Letters Patent is hereby corrected as shown below:

Claim 2, line 17, (Col.6, line 26) "electricity" should be--elasticity--

Signed and Sealed this

First Day of September, 1987

Attest:

DONALD J. QUIGG

Attesting Officer

Commissioner of Patents and Trademarks